United States Patent [19]

Hashimoto et al.

[11] Patent Number: 4,542,478
[45] Date of Patent: Sep. 17, 1985

[54] ELECTRONIC DICTIONARY AND LANGUAGE INTERPRETER OF SEARCHING AND INDICATING A PART OF SPEECH AND OTHER INDEX INFORMATION OF A SPECIFIC WORD

[75] Inventors: Shintaro Hashimoto, Ikoma; Akira Tanimoto, Kashihara, both of Japan

[73] Assignee: Sharp Kabushiki Kaisha, Osaka, Japan

[21] Appl. No.: 390,699

[22] Filed: Jun. 21, 1982

Related U.S. Application Data

[63] Continuation of Ser. No. 104,830, Dec. 18, 1979.

[30] Foreign Application Priority Data

Dec. 19, 1978 [JP] Japan .................................. 53-165454

[51] Int. Cl.[4] .............................................. G06F 7/00
[52] U.S. Cl. ...................................................... 364/900
[58] Field of Search ... 364/200 MS File, 900 MS File, 364/200, 900

[56] References Cited

U.S. PATENT DOCUMENTS 4,117,542  9/1978  Klausner et al. .................... 364/900
4,159,536  6/1979  Kehoe et al. ........................ 364/900

Primary Examiner—Gareth D. Shaw
Assistant Examiner—John G. Mills
Attorney, Agent, or Firm—Birch, Stewart, Kolasch & Birch

[57] ABSTRACT

A word information storage device is adapted to retrieve symbols for explaining the context of literal forms of translated words in a second language corresponding to a specific word in a first language. The symbols are preliminarily stored in a memory such as ROM together with the relevant literal forms of translated words. The word information storage device causes retrieval of the symbols, and the literal forms of the translated words corresponding to the specific word entered. The word information storage device is further adapted to selectively function as an electronic calculator. A keyboard is provided to be operated as an alphabetical keyboard in a word information searching mode and as a numeral keyboard in an electronic calculator mode. A display screen is provided for simultaneously displaying a specific word in a first language, a plurality of literal forms of translated words in a second language corresponding to the specific word and the respective symbols explaining the context of the literal forms of the translated words.

7 Claims, 11 Drawing Figures

```
        37190.
123456.78
```

```
WAY →N・ミチ・ホ
ウコウ・ホウホウ
```

```
STOP →V・トマル
   −N・テイリュウショ
```

```
FIVE →N・ゴ(5
)
```

```
NOSE →N・ハナ(
カオ)
```

ELECTRONIC DICTIONARY AND LANGUAGE INTERPRETER OF SEARCHING AND INDICATING A PART OF SPEECH AND OTHER INDEX INFORMATION OF A SPECIFIC WORD

This application is a continuation copending application Ser. No. 104,830, filed on Dec. 18, 1979.

BACKGROUND OF THE INVENTION

The present invention relates to a word information storage device and more particularly to an electronic dictionary and language interpreter.

Nowadays, electronic dictionaries and language interpreters have been developed which provide for efficient and rapid retrieval of word information which is stored in a memory. An outline of such an electronic dictionary and language interpreter is shown in, for example, Levy U.S. Pat. No. 4,158,236 issued June 12, 1979, entitled "Electronic Dictionary and Language Interpreter".

In the electronic dictionaries and language interpreters, it is desirous that a part of speech or other index information relevant to a specific word in question be simultaneously developed.

SUMMARY OF THE INVENTION

Accordingly, an object of the present invention is to provide an improved electronic dictionary and language interpreter for taking out a part of speech or other index information related to a specific word in question.

A further object of the present invention is to provide an improved electronic dictionary and language interpreter for performing calculation operations in addition to word information retrieval in connection with a specific word with a part of speech or other index information.

A further object of the present invention is to provide an improved electronic dictionary and language interpreter having means for searching and indicating a plurality of parts of speech and/or translated words.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a word information storage device is adapted to produce parts of speech or other index information in addition to translated words in response to the entry of a specific word. The part of speech and other index information is preliminarily stored in a memory such as a ROM together with the relevant translated words. The word information storage device causes retrieval of the parts of speech and other index information, and the translated words corresponding to the specific word entered. The word information storage device is further adapted to function as an electronic calculator by selection. A keyboard is provided to be operated as an alphabetical keyboard in a word information searching mode and as a numeral keyboard in an electronic calculator mode, both housed in the word information storage device.

BRIEF DESCRIPTION OF THE DRAWING

The present invention will become more fully understood from the detailed description given hereinbelow and accompanying drawing which is given by way of illustration only, and thus is not limitative of the present invention and wherein.

DESCRIPTION OF THE INVENTION

Figure 1:
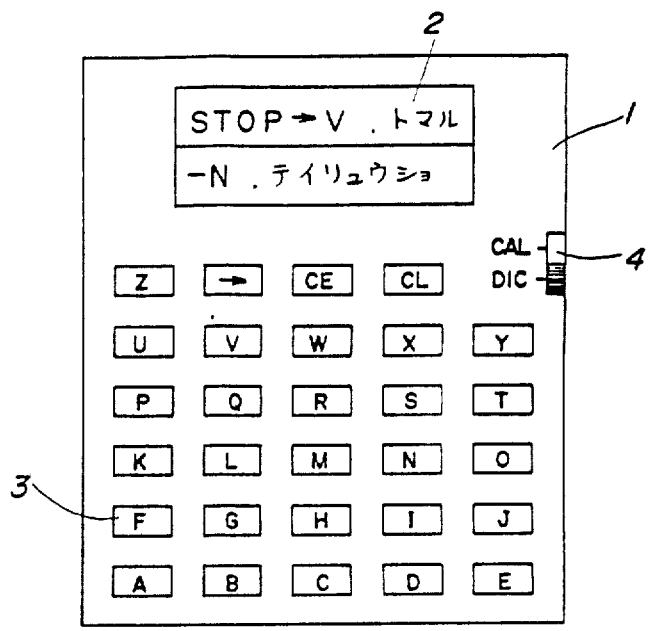
FIG. 1(A) is a plan view of a combined electronic dictionary and electronic calculator according to the present invention, which is placed in an electronic dictionary mode.
FIG. 1(B) is a plan view of the combined electronic dictionary and electronic calculator identical to that shown in FIG. 1(A), the combined electronic dictionary and electronic calculator being placed in an electronic calculator mode.
Figure 1:
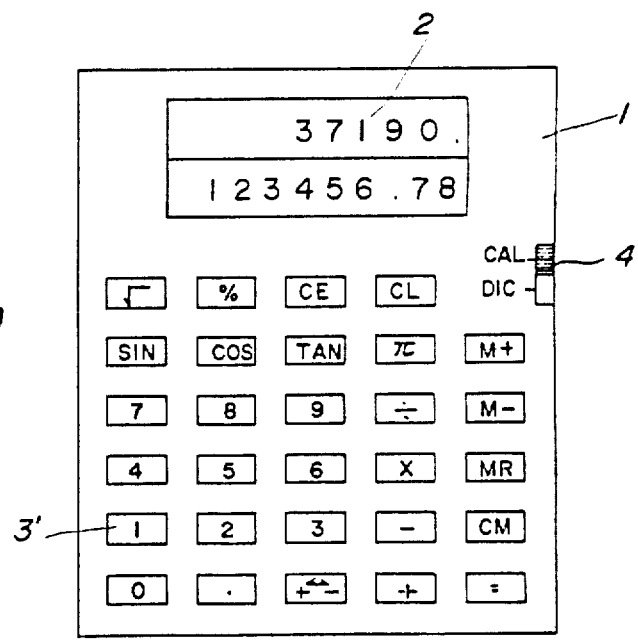

With reference now to FIGS. 1(A) and 1(B), there is indicated a combined electronic dictionary and electronic calculator of the present invention. In particular, FIG. 1(A) shows the combined electronic dictionary and electronic calculator, referred to only as a combined device hereinafter, placed in an electronic dictionary mode. FIG. 1(B) represents the same combined device operated in an electronic dictionary mode.

In FIGS. 1(A) and 1(B), there are provided a cabinet 1, an indicator 2, a plurality of keys 3 or 3', and a mode selection switch 4. The plurality of keys 3 shown in FIG. 1(A) are used in connection with the electronic dictionary mode. The plurality of numerical keys 3' depicted in FIG. 1(B) are operated in conjunction with the electronic calculator mode. Although the alphabetical key 3 is equivalent physically to the numerical key 3', two separate representations of the key as 3 or 3' are adopted to clearly indicate different functions of the alphabetical key 3 and the numerical key 3'. That is, one key has a specific function in the electronic dictionary mode while the same key designates another and different function in the electronic calculator mode. The mode selection switch 4 is actuated to select one from the electronic dictionary mode (DIC) and the electronic calculator mode (CAL). At least two kinds of india are labeled on the top of the respective keys 3 and 3'. Instead, the indicia for the keys may be changed in accordance with the selection by the mode selection switch 4 as disclosed in M. Koike et al U.S. patent application Ser. No. 026,568 filed Apr. 3, 1979, entitled "Thin Keyboard with Changeable Key Indicia", assigned to the present assignee, abandoned in favor of continuation application, Ser. No. 225,864, filed Jan. 16, 1981, now U.S. Pat. No. 4,336,530, issued June 22, 1982. As the details of the change of the indicia for the keys are shown in U.S. Pat. No. 4,336,530 further description thereof is omitted.

A clear key "CL" and a clear entry key "CE" are operated to cause common operations throughout the two modes. The indicator 2 is a two level structure. In the electronic dictionary mode, there are indicated a specific word and its corresponding translated word in the indicator 2 with the former in the upper indicator and the latter in the lower indicator of the two level structure. In the electronic calculator mode, on the other hand, the upper indicator of the two level structure in the indicator 2 is used, for example, to show numerical information stored in a memory while the lower indicator thereof is used to indicate numerical information entered and calculated.

Figures 2A, 2B, 2C, 2D, 2E, 6:
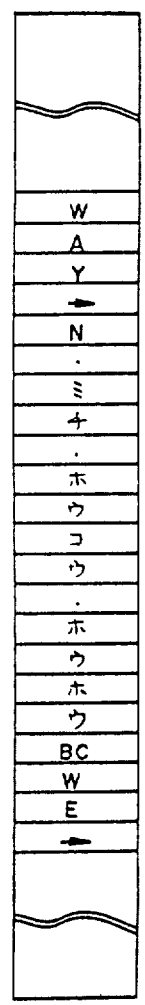
FIGS. 2(A) to 2(E) are plan views of an indicator of the combined electronic dictionary and electronic calculator of the present invention, showing various indicating states of the indicator.
FIG. 6 is a schematic and exemplary representation of the contents of a memory used in connection with the present invention.

FIGS. 2(A) to 2(E) show various examples of indicated states in the two level indicator 2. In particular, FIG. 2(A) is an indication in the electronic calculator mode while FIGS. 2(B) to 2(E) are indications in the electronic dictionary mode.

The indications in the electronic dictionary mode are performed according to the following principle.

In FIG. 2(B):

WAY→N: ミチ・ホウコウ・ホウホウ where
WAY: an entered word in English
→: a separation indication
N: an indicia denoting a noun
·: a separation indication
ミチ,ホウコウ,ホウホウ: three translated words in Japanese corresponding to the entered word.

In FIG. 2(C):

stop→V トマル -N テイリュウジョ where
stop: an entered word in English
→: a separation indication
V: an indicia denoting a noun
·: a separation indication
トマル: a translated word in Japanese as a verb corresponding to the entered word
·: a separation indication
N: the indication denoting a noun
·: the separation indication
テイリュウジョ: another translated word in Japanese as a noun corresponding to the entered word.

In FIG. 2(D):

FIVE→N ゴ [5]

where
FIVE: an entered word in English
→: the separation indication
N: the indication denoting a noun
·: the separation indication
ゴ [5]: a translated word in Japanese corresponding to the entered word, representing a kind of figure by the symbol [5] to thereby distinguish the translated word from "GO" and the like.

In FIG. 2(E):

NOSE→N ハナ [カオ]

whose
NOSE: an entered word in English
→: the separation indication
N: the indication denoting a noun
·: the separation indication
ハナ [カオ]: a translated word in Japanese corresponding to the entered word, showing a part of a face, another translated word corresponding to the word "face" being provided within a bracket to thereby distinguish the translated word corresponding to the word "NOSE" from a translated word corresponding to the word "flower".

Figure 3:
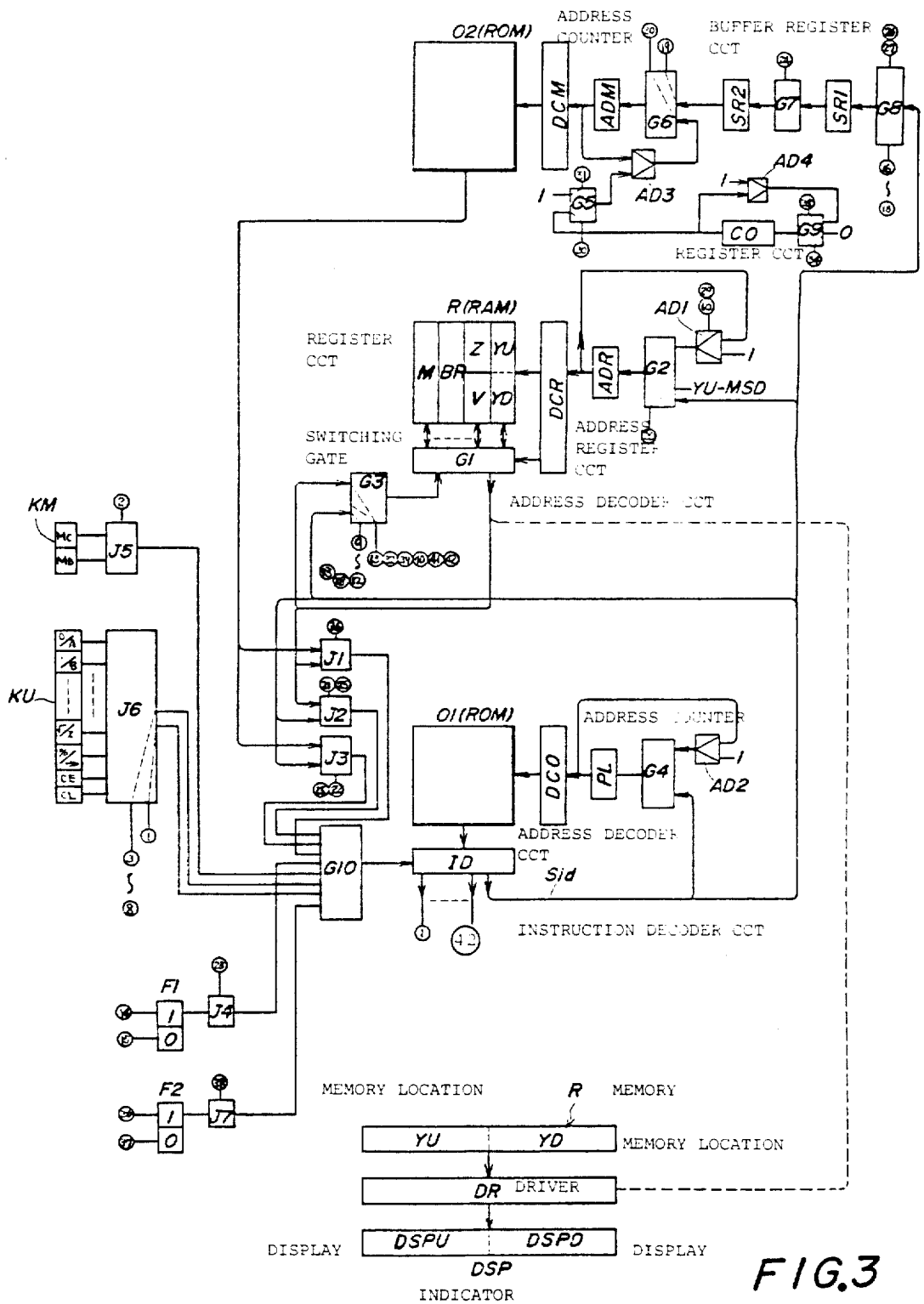
FIG. 3 is a block diagram of a control circuit incorporated into the combined electronic dictionary and electronic calculator of the present invention.

FIG. 3 shows a block diagram of a control circuit incorporated into the combined device of the present invention. With reference to FIG. 3, a random access memory (RAM) R is provided which comprises four kinds of register circuits Y,Z,M, and BR. An address register circuit ADR is employed to address the RAM R.

An address decoder circuit DCR is provided for addressing the RAM R. A switching gate G1 is operated to switch the RAM R. An adder and subtractor AD1 is provided to cause addition or subtraction by control There are provided two gate circuits G2 and G3.

A read only memory (ROM) 01 contains a plurality of programs for causing calculation operations and word retrieval. An element denoted as PL is an address counter for the ROM 01. A circuit defined by DCO is an address decoder circuit for the ROM 01. A circuit shown by ID is an instruction decoder circuit. A circuit denoted by G4 is a gate circuit. A circuit shown by AD2 is an adder. The instruction decoder circuit ID generates micro instructions ① through ㊷ and an operand Sid which are applied to relevant circuit elements as indicated in FIG. 3.

An additional memory depicted by 02 is another read only memory (ROM). A counter denoted as ADM is an address counter for the RAM 02. A decoder circuit shown by DCM is an address decoder circuit for the RAM 02. A circuit denoted by AD3 is an adder. Circuits indicated by G6, G7, G8 and G9 are each a gate circuit. Circuits indicated by SR1 and SR2 are buffer register circuits. A circuit shown by CO is a register circuit, rush as a counter. A circuit indicated by AD4 is an adder.

An element depicted by KU is a keyboard containing a plurality of keys 3 and 3'. An element denoted by KM represents the mode selection switch 4. A comparison circuit denoted as $J_1$ is provided for comparing output signals from the ROM 02 with that of the register circuits Y, Z, M, and BR. Another comparison circuit indicated by J2 is employed to compare output signals from the register circuits Y, Z, M, and BR to the operand Sid. A further comparison circuit shown by $J_3$ functions to accomplish comparison between output signals from the ROM 02 and the operand Sid. A gate circuit G10 is connected so that output signals from the gate circuit G10 control the instruction decoder circuit ID so as to prevent the circuit ID from generating the micro instructions and to allow the same to skip, as used for jump operations of programs.

A circuit shown by F1 is an RS type flip-flop circuit. A judge circuit J4 is connected to the RS type flip-flop circuit F1 to determine output signals from the flip-flop circuit F1. Another RS type flip-flop circuit F2 is provided. Another judge circuit J7 is coupled to the RS type flip-flop circuit F2 to judge the output signals from the flip-flop circuit F2. A further judge circuit J5 is connected to the mode selection switch KM to judge mode selection states. A still further judge circuit F6 is coupled to the keyboard KU to determine key input information. An indicator DSP comprises two separate displays DSPU and DSPD as the two level structure. A driver circuit DR is interposed between the indicator DSP and a memory R consisting of two memory locations YU and YD. The contents stored in the memory location YU are indicated in the display DSPU while the contents kept in the memory location YD are shown in the display DSPD.

Figure 4:
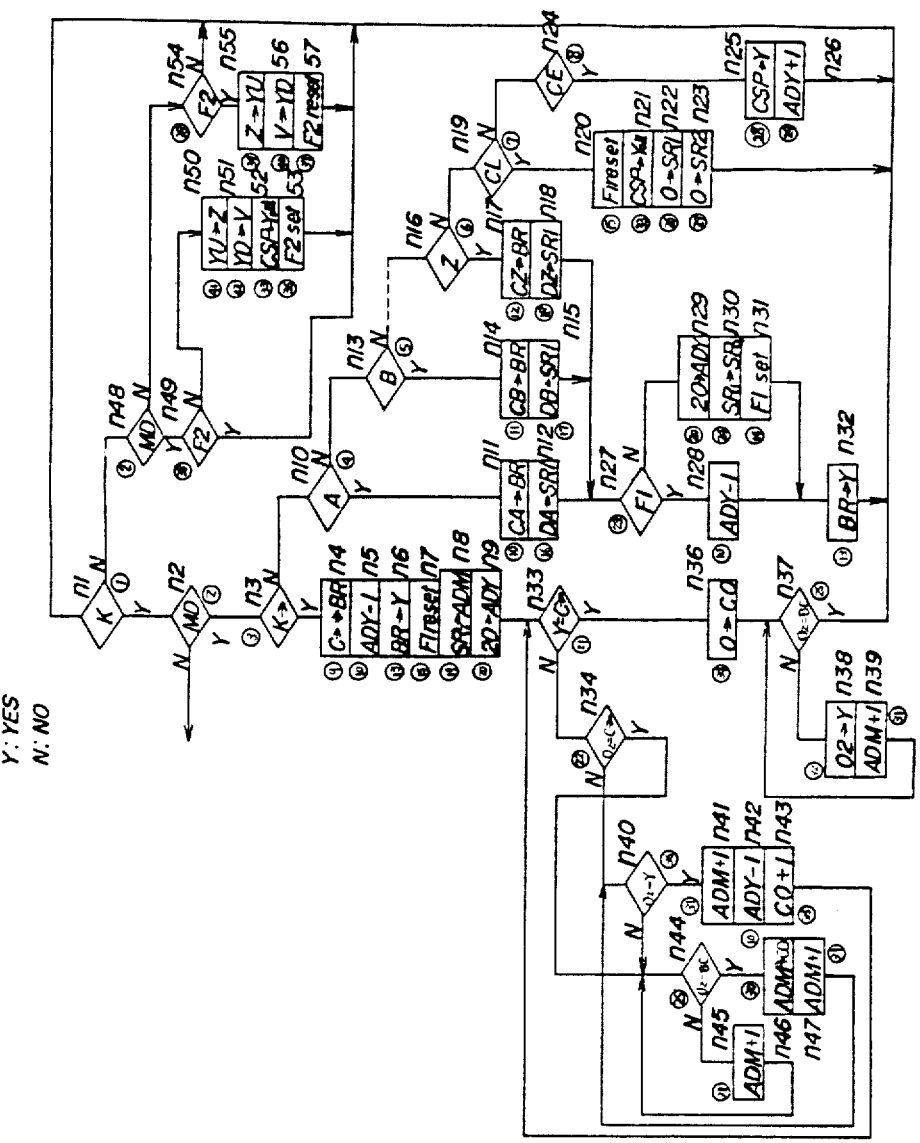
FIGS. 4 and 5 are flow charts caused with the control circuit shown in FIG. 3.

FIG. 4 shows a flow chart for actuating the various circuit elements shown in FIG. 3. In accordance with the flow chart indicated in FIG. 4, the operations of the subject combined device will be described hereinbelow.

All of the steps shown in FIG. 4 have respective labels indicating kinds of the microinstructions 1 to 422 developed from the instruction decoder circuit ID. Each microinstruction is labeled to indicate what it activates during each relevant step. (See the corresponding notations in FIG. 3.).

Electronic Calculator Mode

The electronic calculator mode is executed where the mode selection switch 4 is placed in the DIC position as indicated in FIG. 1(A).

The actuation of the mode selection switch 4 to the DIC position in FIG. 1 is identical to the excitation of a switch MD in FIG. 4 of the mode selection switch KM shown in FIG. 3. As long as no key of the keyboard KU is actuated under the condition that the preceding operations have been placed in the electronic calculator mode before the time, the program repeats steps $n_1 \rightarrow n_{48} \rightarrow n_{54} \rightarrow n_1$. Then when the switch MD is selected so as to execute the electronic dictionary mode, the program advances to steps $n_1 \rightarrow n_{48} \rightarrow n_{49}$.

Since the flip flop circuit $F_2$ is placed in a reset state at the final step of the preceding electronic calculator mode, the program proceeds to step $n_{50}$.

In the preceding electronic calculator mode, the two register circuits YU and YD store the contents to be memorized as either calculation results or entered numerical information, respectively. The contents of YU and YD are now transferred to the other register circuits Z and V, respectively to assure that the contents of Z and V can be continuously utilized in the next electronic calculator mode after the preceding electronic calculator mode has been replaced by the electronic dictionary mode and then the electronic dictionary mode is changed to the next electronic calculator mode. In step $n_{52}$, suppress code information CSP is introduced into all of the storage portions of the T register circuit causing the two register circuits YU and YD to become ready for the introduction of the word information in the electronic dictionary mode. That is, the contents of all of the storage portions of the Y register circuit are canceled. In step $n_{53}$, the flip-flop circuit $F_2$ is turned to the set state so that the circuit $F_2$ stores the conduction state of the switch MD. And then the program turns back to step $n_1$. Then the program advances to steps $n_1 \rightarrow n_{48} \rightarrow n_{49} \rightarrow n_1$.

Entry of A Specific Word for Retrieval Purposes in the Electronic Dictionary Mode Prior to the description of the entry of a specific word for retrieval purposes in the electronic dictionary mode, the ROM 02 is described in detail.

FIG. 6 shows schematically the contents of the ROM 02 where a train of coded information each representing a character is stored in order.

The ROM 02 stores a multitude of these trains of coded information.

The order of words each positioned in a leading address of each train is alphabetical, from "A" to "Z". According to a preferred embodiment of the present invention, a specific train of the coded information designating a specific English word such as "WAY" and other information corresponding thereto are shown in FIG. 6.

The coded information corresponding to the three characters "W", "A" and "Y" is stored from a leading address of a certain train as indicated in FIG. 6. A specific English word "WAY" is initially stored in the certain train.

A separation indicator "→" is subsequently stored to indicate that the following character is a character for showing a part of speech related to the specific English word. Coded information representing the part of speech is successively stored. In this instance, a character indicative of "N" as denoting a noun is stored. Coded information indicating another separation indicator "." is stored to divide the part of speech from a translated Japanese word. After the separation indicator ".", the translated Japanese word is stored in the form of coded information. When there are a plurality of the translated Japanese words, the separation indicator "." is allotted to divide them. A boundary code BC is interposed between the translated Japanese words in connection with "WAY" and the following English specific word "WE".

The ROM 02 preliminarily stores a number of trains each containing a specific English word and one or more translated Japenese words together with the indicia of the part of speech as mentioned in connection with FIG. 6. Needless to say, other languages rather than English or Japanese can be used within the scope of the present invention.

Turning back to the description about the electronic dictionary mode, the above defined ROM 02 is addressed as follows. In the electronic dictionary mode, one or more translated Japanese words corresponding to a specific English word "WAY" are obtained by the actuation of the alphabetical keys 3 in the order of "W", "A", "Y" and "→" as shown in FIG. 2(B).

After the switch MD is selected to perform the electronic dictionary mode, a certain alphabetical key 3 designating a character "W" is actuated in which case the key actuation is detected in step $n_1$. And then the program leads to steps $n_1 \rightarrow n_2 \rightarrow n_3$. Step $n_3$ is performed to detect the actuation of another search key represented by "→".

But at the time, step $n_{10}$ is executed because the search key is not actuated. Steps $n_{10}$ through $n_{16}$ are programmed to as to determine what kinds of the alphabetical keys 3 are actuated.

Although the detecting procedure in detecting the actuation of the alphabetical key 3 representative of "w" is not shown in FIG. 4, it can be easily recognized from the other detecting procedures in detecting the actuation of keys relating to other characters "A", "B" and "Z" as indicated. Provided that the alphabetical key 3 relating to the character "B" is actuated, the program advances to steps $n_3 \rightarrow n_{10} \rightarrow n_{13} \rightarrow n_{14}$, whereby coded information CB corresponding to the character "B" is entered into the register circuit BR in the last $n_{14}$ step, the coded information CB being equivalent to that stored in a certain train of the ROM 02. Therefore, when the alphabetical key 3 directed to the character "w" is actuated coded information equal to the character "w" is admitted into the register circuit BR.

In the following step $n_{15}$, provided that the alphabetical key 3 directed to the character "B" is actuated, step values DB of trains of the ROM 02 for directing all the trains whose leading address has the character of "B" in the form of the coded information are temporarily stored in the buffer register circuit SR1. Similarly, when the alphabetical key 3 directed to the character "w" is actuated, the buffer register circuit SR1 is adapted to have the step values of the trains in the ROM 02 for directing all the trains the leading address of which has the character of "w" in the form of the code information.

After the buffer register circuit SR1 receives the step values of the trains, step $n_{27}$ is performed to detect the number of the characters entered into control circuit by the keyboard actuation. As the flip flop circuit F1 is initially placed in a reset state, step $n_{29}$ is executed. 20→ADY as caused in step $n_{29}$ means that an address corresponding to the supreme digit of the register circuit Y is preliminarily selected. In step $n_{30}$, the contents stored in the buffer register circuit SR1 are transferred into the other buffer register circuit SR2 under the conditions where the first character information is now entered. In the following step $n_{31}$, the flip flop circuit $F_1$ is turned to a reset state so that steps $n_{27} \rightarrow n_{28}$ are conducted in response to the actuation of the second character "A" belonging to the specific English word "WAY".

In step $n_{32}$, BR→Y is conducted so that the coded information equivalent to the character now entered, "W" is entered to the register circuit Y. As 20→ADY is conducted in step $n_{29}$ in connection with the entrance of the first character "w", the supreme digit of the register circuit Y receives coded information CZ equivalent to the first character "w".

As indicated in FIG. 3, the contents of the register circuit Y is indicated in the indicator DSP. The first character "w" entered is displayed in the supreme digit of the indicator DSP. After step $n_{32}$ is executed, the program returns back to step $n_1$.

Under the circumstances, the second alphabetical key 3 designating "A" is subsequently actuated. An actuation of the second alphabetical key 3 enables steps $n_1 \rightarrow n_2 \rightarrow n_3 \rightarrow n_{10} \rightarrow n_{11}$. In step $n_{11}$, coded information CA equivalent to the character "A" is introduced into the register circuit BR. In step $n_{12}$, the buffer register circuit SR1 would have address information DA defined to direct to all the leading addresses of the ROM 02 in which the coded information equivalent to the character "A" should be stored, if the character "A" were the firstly entered character. Since actually the character "A" is the second entered character, the above presumed operation is not carried out.

The program proceeds to step $n_{27} \rightarrow n_{28}$ as the flip-flop circuit F1 is set. In step $n_{28}$, ADY−1 is performed which means the subtraction of one address from the addresses stored in the register circuit Y. This is responsive to the following step $n_{32}$ where the coded information representative of the alphabetical character stored in the register circuit BR is transmitted to the second digit of the register circuit Y.

As described above, the entered character information is subsequently entered into the register circuit Y by the successive actuation of the alphabetical keys 3 and then displayed in the indicator DSP for confirmation purposes. When erroneous actuation of the alphabetical keys 3 is discovered, the clear entry key "CE" is energized. In such a case, in step $n_{25}$, suppress code information is entered into the digit of the register circuit Y which receives now the erroneous character information. Then, in the following step $n_{26}$, ADY+1 is conducted to increment the addresses of the register circuit Y by one, namely, to refresh the register circuit Y. Therefore, when the program proceeds to step $n_{28}$ under the condition that a correct character is entered, it is assumed that the same address of the register circuit Y is to be selected. When it is desired that all of the character information be canceled, the clear key "CL" is actuated to conduct steps $n_{20}$ to $n_{23}$. In such a case, the suppress code information is entered into all of the digits of the register circuit Y to clear the buffer register circuits SR1 and SR2 and to allow the flip flop circuit F1 to be reset.

Execution of Retrieval of One or More Translated Words

After the specific English word is accurately entered, the search key "→" is actuated to perform the retrieval of one or more translated words. The program advances to steps $n_1 \rightarrow n_2 \rightarrow n_3 \rightarrow n_4$. Coded information responsive to the actuation of the search key "→" is entered into the register circuit BR in step $n_4$. In step $n_5$, by the calculation of ADY−1, one address is subtracted from the address of the register circuit Y. In step $n_6$, the register circuit Y has the coded information equivalent to "→" which is stored in the register circuit BR. This coded information is utilized to indicate the separation indication between the English word entered and the translated Japanese word. The reset state of the flip flop circuit F1 caused in step $n_7$ is to become responsive to the following introduction of the English word as the entrance of the preceding English word "WAY" is completed. In step $n_{30}$, the buffer register circuit SR2 has the information of all the leading addresses of the ROM 02 in which the initial character should be stored. As the initial character is assumed to be "w" according to a preferred embodiment of the present invention, the coded information directing to the initial character "w" is DZ. Since the coded information stored in the buffer register circuit SR2 is transferred to the address counter ADM for the ROM 02 in step $n_8$, it occurs that the address of the ROM 02 is adapted to select the leading addresses in which the first character "w" should be stored. In the following step $n_9$, it is set that the supreme digit of the register circuit Y be reselected. Under the conditions where the entered characters are "WAY", it is apparent that the digit containing the character "w" be adapted for selection purposes.

The following step $n_{33}$ is executed to determine whether output signals from the register circuit Y are equivalent to the coded information "C→" designating "→". If so, it is directed that all the retrieval procedures are completed. If the contents of the register circuit Y are not coincident with that coded information, step $n_{34}$ is performed.

In step $n_{34}$, it is determined whether the output signals from the ROM 02 are equivalent to the coded information "c→" indicating the separation indication "→". The detection performed in step $n_{34}$ is significant in the situation where the number of the entered English characters to cause the retrieval is larger than the number of the English characters stored in the ROM 02. When the output signals from the ROM 02 represent the coded information "c→" under the conditions where the register circuit Y has the coded information "c→", steps $n_{34} \rightarrow n_{44}$ are executed so as to cause the retrieval of the following English characters stored in the ROM 02 as described below.

When the English word "WAY" should be searched to find one or more translated Japanese words, the program advances through steps $n_1 \rightarrow n_2 \rightarrow n_3 \rightarrow n_4 \rightarrow n_5 \rightarrow n_6 \rightarrow n_7 \rightarrow n_8 \rightarrow n_9 \rightarrow n_{33} \rightarrow n_{34}$ immediately after the actuation of the search key. In such a case, the output signals from the ROM 02 are the coded information of the character "W" stored in the leading address of the first train belonging to a group of certain trains which are characterized in that all the leading addresses have the character "W". For example, the first train is assumed to be representative of a Certain English word such as "WAIT". Accordingly, the register circuit Y provides the output signals representing the character "W". And, it is determined that 02≠C→ and the program proceeds to step $n_{40}$. As 02=Y, steps $n_{40} \rightarrow n_{41}$ are executed. For the purpose of successively causing the comparison between the English word entered and one of the English words stored in the ROM 02, in step $n_{41}$, ADM+1 is executed to advance the address of the ROM 02 by one so that the coded informamtion representing the second character "A" in connection with the word of the first train "WAIT" is developed from the ROM 02. In the following step $n_{42}$, ADY−1 is performed to direct the following digit for comparison purposes. At the same time, the coded information designating the second character A of the entered word "WAY" is developed from the register circuit Y.

In step $n_{43}$, CO+1 is executed to store the coincident digit between the entered word and one of the words stored in the ROM 02 so as to minimize the searching period of time for the following character of the words stored in the ROM 02. Since a coincidence is established between the first character "W" of the entered word "WAY" and the same "W" of the stored word "WAIT", CO+1 is performed for the register circuit CO to become "1", the register circuit CO being initially reset.

Thereafter, the program returns back to step $n_{33}$ under the condtion where in steps $n_{41}$ and $n_{42}$, the addresses of the register circuit Y and the ROM 02 are each advanced by one. As the second characters of the entered word "WAY" and the stored word "WAIT" are both the character "A", the program proceeds to steps $n_{33} \rightarrow n_{34} \rightarrow n_{40} \rightarrow n_{41} \rightarrow n_{42} \rightarrow n_{43}$ to thereby determine CO=2. Accordingly, the program advances to steps $n_{33} \rightarrow n_{34} \rightarrow n_{40}$. The third character "Y" in connection with the entered word "WAY" is stored in the register circuit Y while the third character "I" with respect to the stored word "WAIT" is stored in the ROM 02. Therefore, 02≠Y is established to advance to steps $n_{40} \rightarrow n_{44}$.

In step $n_{44}$, a determination of whether the output signals from the ROM 02 are equivalent to the boundary code BC is caused. In the absence of the boundary code BC, the program advances to steps $n_{44} \rightarrow n_{45}$ to incrementally advance the address of the ROM 02. Under the circumstances, the third character "I" of the stored word "WAIT" is retrieved. In step $n_{44}$, the output signals from the ROM 02 are the coded information designating the character "T". Therefore, the program proceeds to step $n_{45}$. In this way, the address counter ADM for the ROM 02 is counting up until the ROM 02 generates the boundary code BC as the output signal. In other words, the data of the ROM 02 are skipped in connection with the stored word "WAIT". When the boundary code BC develops from the ROM 02, the boundary code BC being stored for indicating that the translated word corresponding to the word "WAIT" is completely developed, 02=BC is accomplished to proceed to step $n_{46}$.

In step $n_{46}$, ADM+CO is executed under the condition that CO=2. ADM+2 is therefore performed so that the address of the ROM 02 to be selected is increased by two. Since the two characters "WA" from the begining of the words "WAY" and "WAIT" are coincident, two digits of the address of the ROM 02 are skipped. In step $n_{47}$, ADM+1 is executed to add one to ADM+CO in step $n_{46}$ with the object of selecting the third character of the word for comparison purposes.

If it is assumed that the word following the word "WAIT" stored in the ROM 02 is "WALL", the ROM 02 develops the code information representing the third character "L" of the stored word "WALL".

Although the condition 02=Y is tested in step $n_{40}$, the equation 02=Y is not established since the register circuit Y maintains the coded information designating the third character "Y" of the word "WAY". Accordingly, the program repeats steps $n_{44} \rightarrow n_{45}$ to cause the boundary code BC to develop from the last address of the train containing a specific word and its translated words. After 02=BC, ADM+CO+1 is executed. Provided that the word "WAY" is stored immediately after the word "WALL" and its translated words, the ROM 02 provides the coded information representing the third character "Y" of the stored word "WAY" by the calculation ADM+CO+1.

02=Y is accomplished in step $n_{40}$. The program proceeds to steps $n_{41} \rightarrow n_{42} \rightarrow n_{43} \rightarrow n_{33}$. The register circuit Y is caused to select the lower digit by one in step $n_{42}$. When the search key "→" is actuated immediately after the introduction of the word "WAY" by means of the aliphabetical keys 3, the coded inforamtion indicating "→" is entered. Therefore, in this instance, the register circuit Y develops the coded information representing "→". As Y=C→is determined in step $n_{33}$, the program leads to step $n_{36}$. O→CO caused in step $n_{36}$ is to allow the register circuit CO to be reset with the object of being ready for the following retrieval operations as a series of the retrieval operations are completed. The program leads to steps $n_{37} \rightarrow n_{38} n_{39} \rightarrow n_{37}$ where the translated words stored are transferred to the register circuit Y.

That is, before that time, the register circuit Y keeps the coded information of "WAY→" which is indicated in the indicator DSP. Then the translated words "N・きチ... ぼりぞう" in connection with the English word "WAY" are entered into the register circuit Y in addition to the entered word "WAY→", so that the indicator DSP displays the translated words together with the entered English word as shown in FIG. 2(B). Until the ROM 02 develops the boundary code BC, the output signals from the ROM 02 are introduced into the register circuit Y as caused in step $n_{38}$. Each time the output signals from the ROM 02 are admitted into the register circuit Y, the following address of the ROM 02 is selected. When 02=BC is established all the retrieval procedures are completed to thereby return back to step $n_1$.

Under the circumstances that 02=C is executed in step $n_{34}$, step $n_{44}$ and the following steps are conducted as follows. Suppose that it is desired that another specific word WEIGHT is subjected to the retrieval procedure and then provided that a further different word, say, "WE", having at least one common character, say, "WE", to the specific word "WEIGHT" is stored before the specific word "WEIGHT", the following steps starting from step $n_{44}$ are available. The common characters "WE" are at the front position of the words and the further different word "WE" has fewer characters than the specific word "WEIGHT".

In such a case, $Y=C\rightarrow$ is not established in step $n_{33}$ and $02=C\rightarrow$ is determined in step $n_{34}$. As the specific word "WEIGHT" is not consistent with the further different word "WE", the program reaches step $n_{44}$ wherein steps $n_{44}\rightarrow n_{45}\rightarrow n_{44}$ are conducted to skip the word "WE".

As described above, the entered English word is displayed in the indicator DSP.

Electronic Calculator Mode

The mode selection switch 4 is switched to the electronic calculator mode to thereby make the switch MD shown in FIG. 3 turn off. Before the time, the program leads to steps $n_1\rightarrow n_{48}\rightarrow n_{49}\rightarrow n_1$. When the switch MD is turned off (MD=0), take place steps $n_1\rightarrow n_{48}\rightarrow n_{54}\rightarrow n_{55}$. Immediately before the preceding electronic dictionary mode is selected, the contents stored in the register circuit YU for the purpose of memory are transmitted to the register circuit Z in step $n_{50}$. In step $n_{55}$, $Z\rightarrow YU$ is executed. In step $n_{51}$, the calculation results and the entered numerical information stored in the register circuit YD are sent to the register circuit V. The contents of the register circuit V are returned back to the register circuit YD in step $n_{56}$. Thus, the indicator DSP is adapted to show the numerical information with the aim of utilizing it for the electronic calculator mode purposes.

Figure 5:
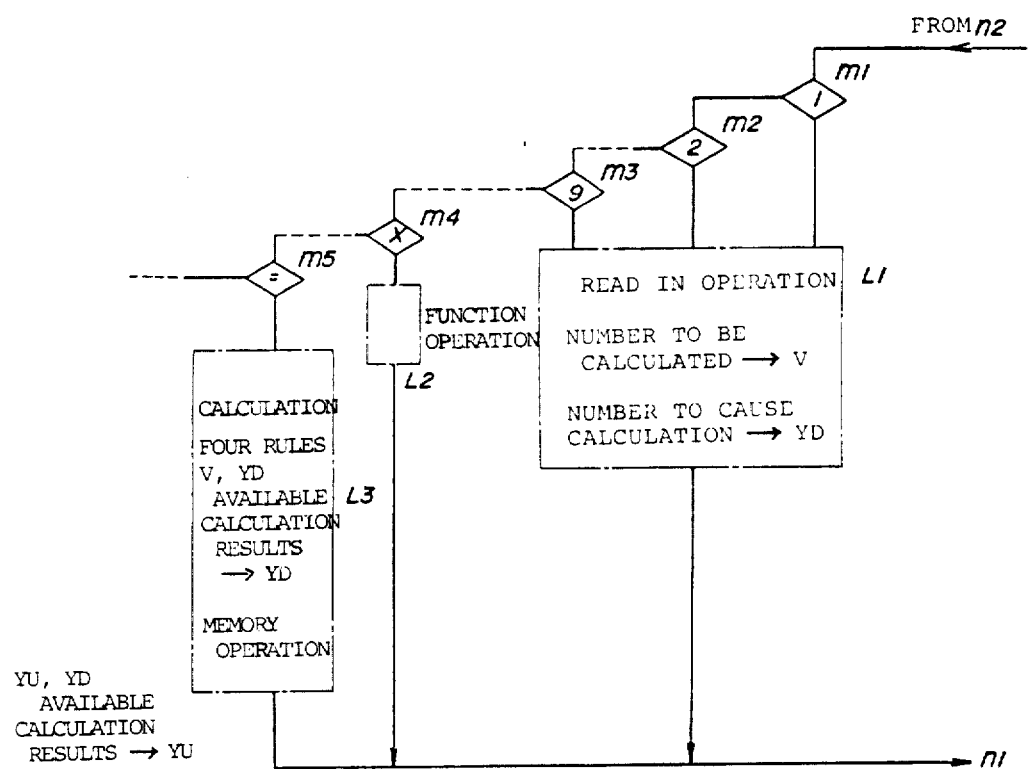

Thereafter, the numerical and function keys 3' are actuated as in a conventional electronic calculator. FIG. 5 shows the operations used for the electronic calculator mode. An actuation of the numerical keys 3 enables steps $n_1\rightarrow n_2\rightarrow ml$ to be executed. Steps $m_1$ to $m_3$ are conducted to determine the kind of the numerical keys actuated. In the following step L1, the entered digit is read onto the control circuit. The register circuit YD has the digit entered. When the calculation is terminated or one of the numerical keys 3 is actuated immediately after the actuation of functional keys, the contents preliminarily stored in the register circuit YD are transferred to the register circuit V and, in addition, fresh numerical information is entered in the lowest digit of the register circuit YD. Upon the subsequent introduction by the numerical key actuation, the corresponding numerical information is successively introduced into the register circuit YD.

Thus number to be calculated is entered into the register circuit V while number to cause calculation is admitted to the register circuit YD, both with the aim of being ready for the subsequent calculation. When one of the function keys, such as a multiplication key is actuated, the program leads to steps $n_1\rightarrow n_2\rightarrow m_1\rightarrow m_2\rightarrow m_3\rightarrow m_4\rightarrow L2$. Step L2 is executed to store the kind of the function defined by the one of the function keys, say, multiplication.

Step L2 is performed to cause other function operations such as clear, clear entry, memory clear, or oter calculation operations as is well-known.

Upon the actuation of an equal key to obtain the calculation results, the program further leads to $\rightarrow m_5\rightarrow L3$ to thereby cause a defined calculation.

To cause four rules, the register circuits V and YD are utilized together with other register circuits although not shown in FIG. 5. The calculation results are entered into the register circuit YD so that the display DSPD indicates them. To conduct the memory calcuation, the register circuits YI and YD are utilized and, if necessary, the other register circuits are available although not shown in FIG. 5. The register circuit YU contains the calculation results, wherein the display DSPU indicates the calculation results.

As described above, the two register circuits YU and YD are effectively available in the electronic calculator mode.

Some of features of the present invention are summarized as follows:

1. A part of speech or other relevant information is provided in conjunction with its translated word corresponding to a specific word entered by means of a keyboard. All of the part of speech, the other relevant information, and the translated word are stored in a memory means. A word equivalent to the specific word entered can be stored in the memory means together with them. It is unnecessary for the word equal to the specific word to be stored in the memory means since the specific word entered can be identified.

2. If there are present two or more translated words stored in the memory means, they are developed together with their parts of speech or the other relevant information. In such a case, it is possible that the parts of speech associated with each of the two or more translated words could be different.

3. The device of the present invention acts as an electronic dictionary and language interpreter in addition to an electronic calculator. In such a case, an indicator is responsive to the two modes by switching.

4. If there is information used in the first electronic calculator mode, the information is transferred into a memory upon the selection of the electronic dictionary mode. The information is returned back to a circuit element used to conduct the second electronic calculator mode in response to switching back to the second electronic calculator mode. The information is transferred to an indicator for display purposes immediately after switching to the second electronic calculator mode.

5. In conducting retrieval procedures in the electronic dictionary mode, if there is present one or more addresses contained within a memory in which one or more characters were already consistent with one or more characters entered by the keyboard actuation, the consistent one or more addresses are skipped with the help of control of an address counter as caused in step $n_{46}$. An aim of this skipped retrieval procedure is to shorten a retrieval period of time for the following address.

6. An indicator is provided so that one or more translated words in addition to an entered word are dislayed in the electronic dictionary mode. The indicator is structured as a two level display wherein the one or more translated words and the entered word are indicated separately in the upper portion and the lower portion in the two level display, respectively, in the electronic dictionary mode. In the electronic calculator mode, the two level display is available such that the upper portion is used to indicate the contents of a memory and the lower portion is used to indicate numerical and/or function information entered by the keyboard actuation and to indicate calculation results, and vice versa.

7. A simple keyboard is available as a keyboard used in connection with an electronic calculator mode and a different keyboard is utilized in connection with an electronic dictionary mode. The keyboard symbols are changed so as to be adopted for use with one of the two different types of keyboards, according to actuation of a mode selection switch.

8. A clear key and a clear entry key are utilized in both the electronic calculator mode and the electronic dictionary mode to cause cancellation of entered information, either in whole or in part, respectively.

9. The memory means for containing a great deal of word information comprises a read only memory (ROM).

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic dictionary and language translator comprising:

memory means for storing character information related to a plurality of words in a first language and a like plurality of groups of translated words in a second language, each group corresponding to a separate one of the individual words in said first language and containing translated words each of which is a different translation of the corresponding one of the individual words in the first language, at least a portion of the groups including at least two translated words in said second language, said memory means further storing predetermined symbols for identifying the part of speech of each of the respective forms translated words in each of said groups in said second language;

input means for entering character information related to a selected individual word in said first language;

address means responsive to the input means for addressing the memory means to identify the address in said memory means at which said selected individual word is stored;

translator means responsive to said address means for retrieving from said memory means said group of translated words in said second language corresponding to said selected individual word and said predetermined parts of speech symbols for each of said words in said second language that are retrieved; and means responsive to said translator means for simultaneously displaying said selected individual word, said corresponding group of translated words and the respective predetermined parts of speech symbols for each of said translated words in said group of words in said second language whereby an operator may select an appropriate one of said words from said group.

2. The invention according to claim 1, wherein said predetermined symbols comprise notations which explain the grammatical context of each separate one of the respective translated words in each corresponding group.

3. The invention according to claim 1, further including:

mode selector means for enabling the electronic dictionary and language translator to be switched between a translating mode of operation and a calculation mode of operation;

keyboard means for inputting numerical information into said memory means related to desired calculations when in said calculator mode of operation;

secondary storage means coupled to said memory means for receiving and temporarily storing said information input into said memory during said calculation mode in response to a first control signal; and control means for generating said first control signal to transfer said information from said memory means to said secondary storage means in response to said mode selector means being switched from said calculator mode to said translator mode and for generating a second control signal to transfer said information from said secondary storage means to said memory means when said mode selector means is switched back to said calculator mode.

4. The invention according to claim 3 further including calculation means responsive to said keyboard means for performing said desired calculations, and wherein said means for displaying, responsive to said calculation means, separately and simultaneously displays the input numerical information and a result of said desired calculations thereon.

5. A device that is capable of performing numerical calculations and of storing natural language word information comprising:

input means for entering word information and numerical information;

memory means for storing information comprising words and characteristic codes each representing a characteristic of a respective word;

address means responsive to said entered word information for addressing said memory means so as to read-out therefrom information comprising at least one word and a characteristic associated with said one word;

calculation means for performing calculations on said entered numerical information; and display means responsive to the information read-out by said address means and operable to display said one word and to indicate the characteristic of said one word, and, if more than one word is read-out by said address means, operable to display a plurality of read-out words and to indicate the respective characteristics thereof, the display means being further operable to display the results of calculations performed by said calculation means.

6. The invention according to claim 5, wherein said information stored in said memory means comprises a plurality of first words in a first language, a like plurality of groups of translated words in a second language, each group corresponding to a separate one of the plurality of first words, at least a portion of the groups including at least two translated words in the second language, and wherein said characteristic codes indicate a part of speech for each translated word in each of said groups in said second language.

7. The invention according to claim 6, wherein said display means separately and simultaneously displays said entered numerical information and the results of calculations performed by said calculation means.

* * * * *